May 16, 1939.  W. H. FRANK  2,158,656
METHOD FOR MAKING BUS DUCTS
Filed Dec. 23, 1935  6 Sheets-Sheet 2
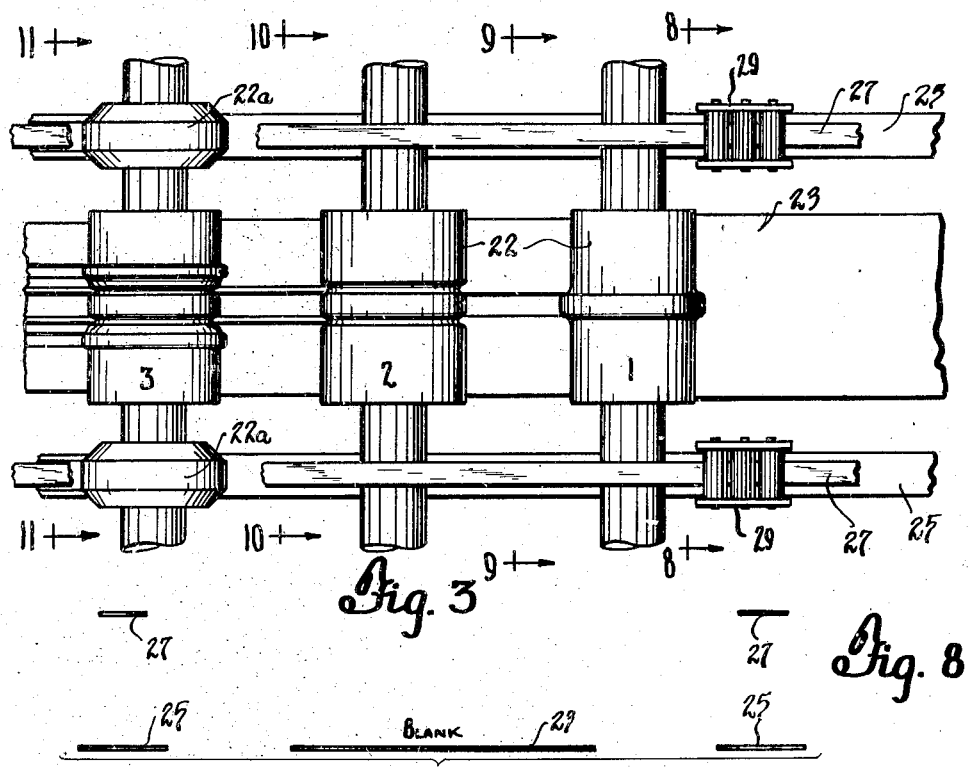
Fig. 3
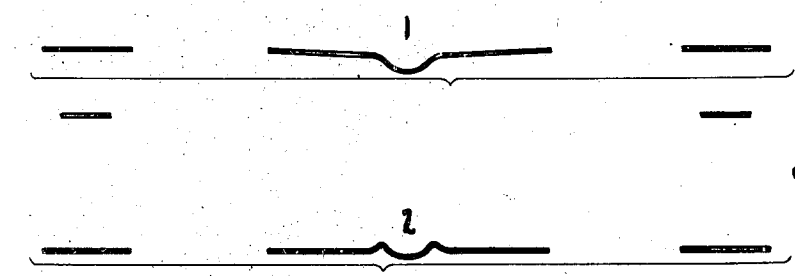
Fig. 8
Fig. 9
Fig. 10
Fig. 11
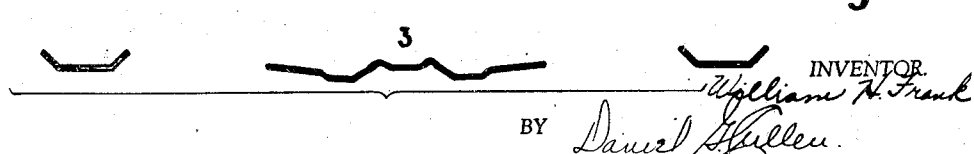
INVENTOR.
William H. Frank
BY Daniel H. Kullen.
ATTORNEY.

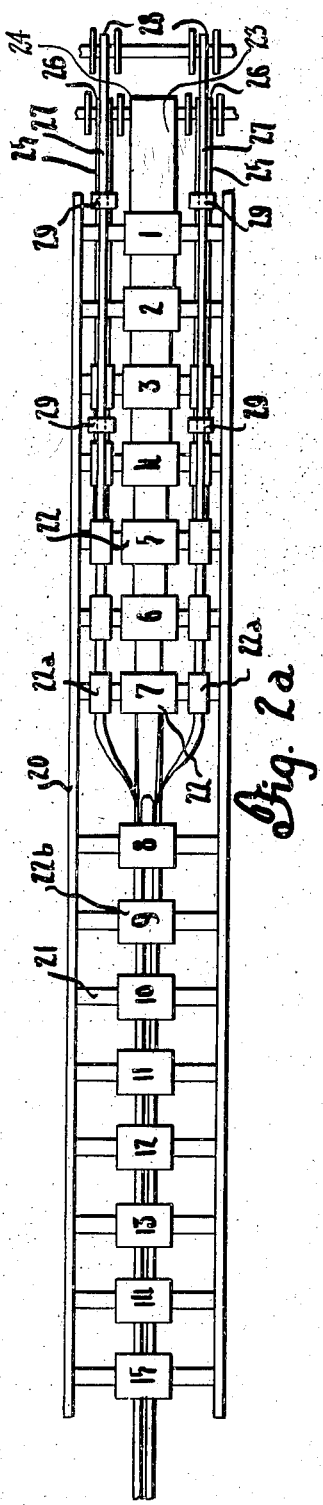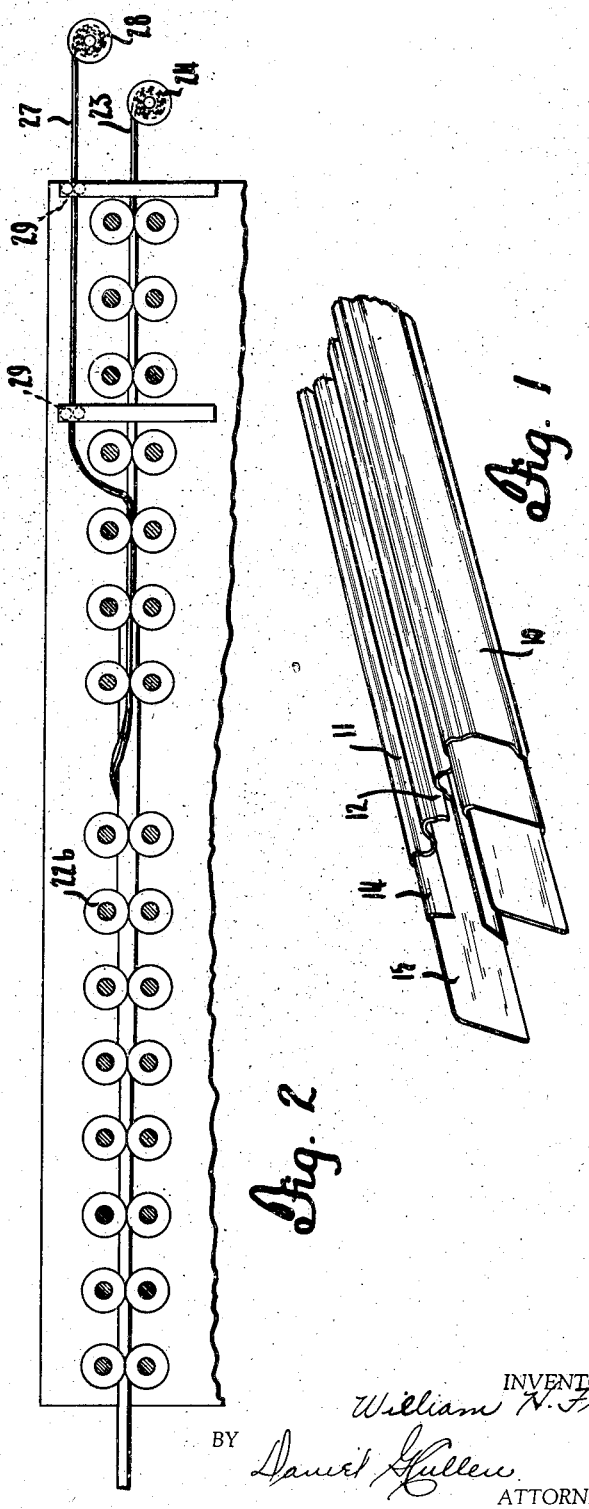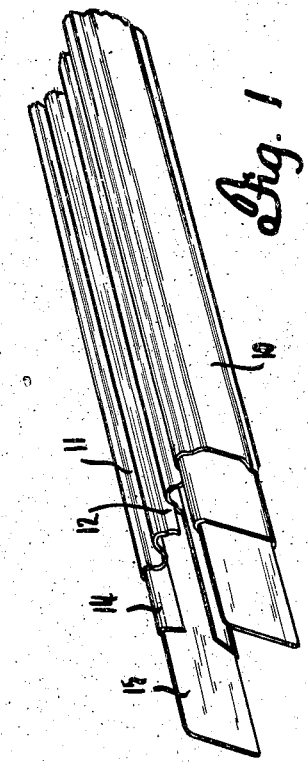

INVENTOR.
William H. Frank
BY Daniel G. Cullen.
ATTORNEY.

May 16, 1939.　　　　W. H. FRANK　　　　2,158,656
METHOD FOR MAKING BUS DUCTS
Filed Dec. 23, 1935　　　6 Sheets-Sheet 4
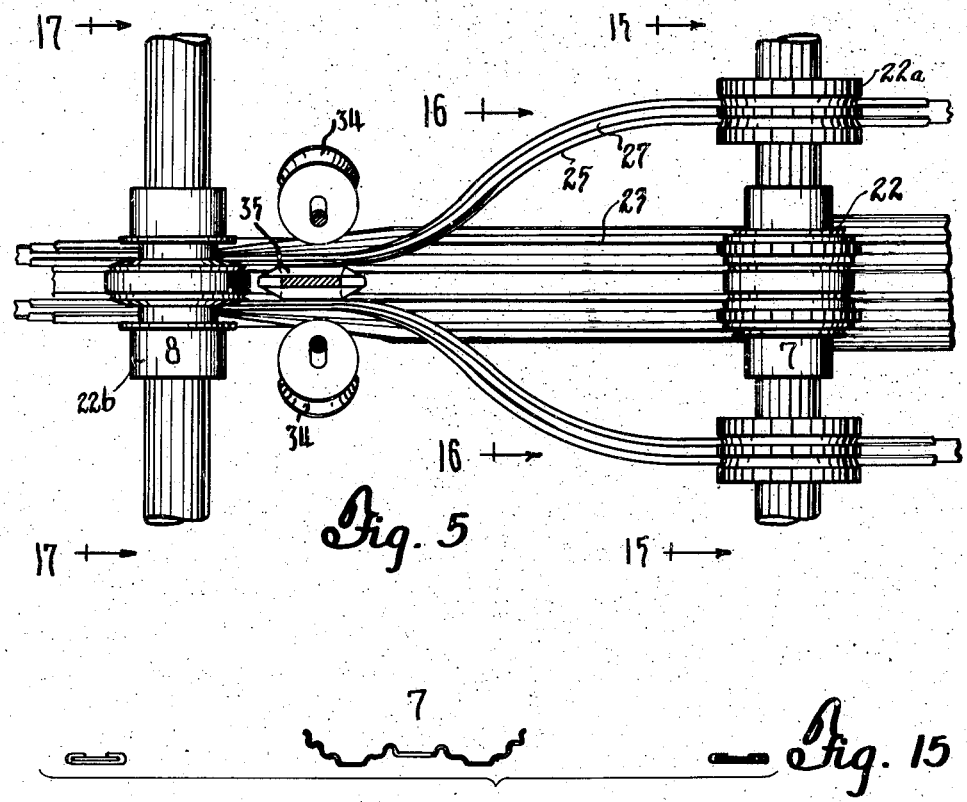
Fig. 5
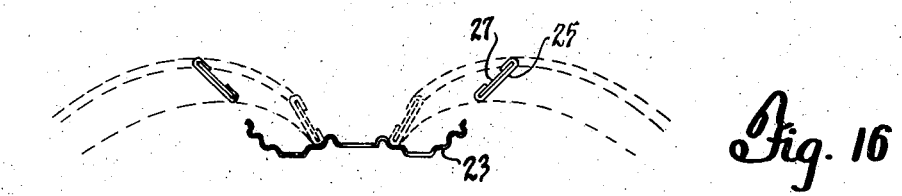
Fig. 15
Fig. 16
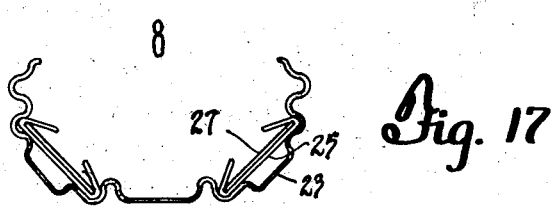
Fig. 17
INVENTOR.
William H. Frank
BY Daniel G. Cullen
ATTORNEY.

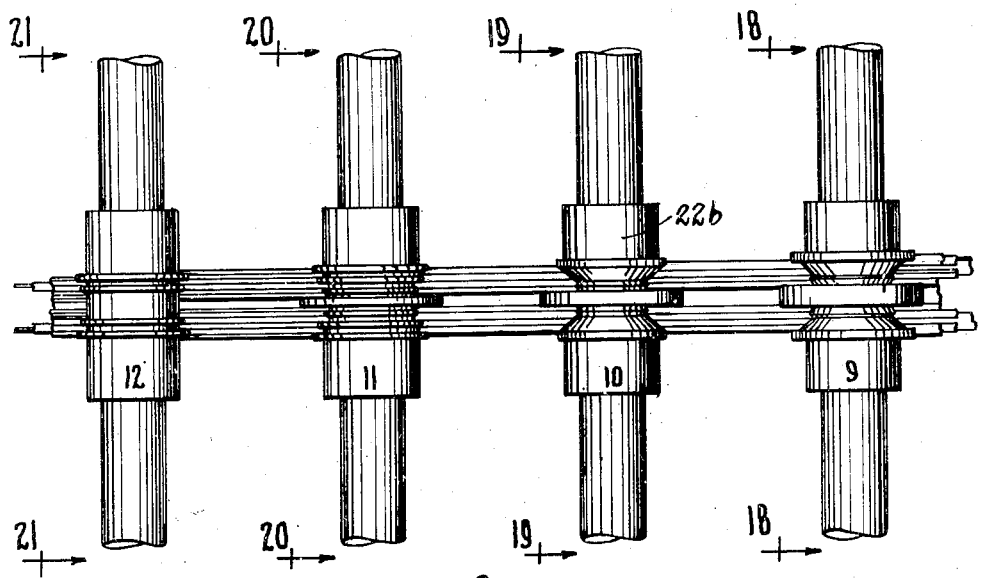
Fig. 6
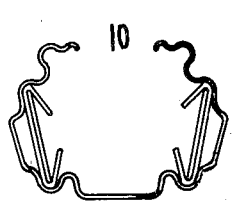
Fig. 18
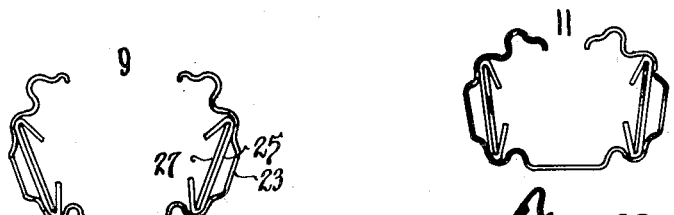
Fig. 20
Fig. 19
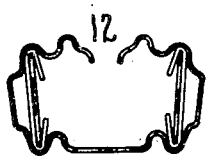
Fig. 21

May 16, 1939.　　　W. H. FRANK　　　2,158,656
METHOD FOR MAKING BUS DUCTS
Filed Dec. 23, 1935　　　6 Sheets-Sheet 6

INVENTOR.
William H. Frank
BY Daniel G. Cullen
ATTORNEY.

Patented May 16, 1939

2,158,656

UNITED STATES PATENT OFFICE 2,158,656

METHOD FOR MAKING BUS DUCTS

William H. Frank, Detroit, Mich.

Application December 23, 1935, Serial No. 55,728

5 Claims. (Cl. 153—1)

This application relates to a method and a machine for manufacturing slotted tubular bus duct of the character disclosed in a prior application of William H. Frank, Serial No. 20,114, filed May 6, 1935 (Patent No. 2,088,106, granted July 27, 1937), and useful in electrical distribution systems of the character known as trolley duct.

Trolley duct is generally made of slotted tubular bus duct which generally includes a sheet metal casing or shell or duct having a slotted wall and containing bus bars which, in the case of trolley duct of the character herein disclosed, are enshrouded within folded strips of insulation. For manufacturing such bus duct conveniently and economically, generally similar but somewhat different methods have been developed.

One of the methods for manufacturing such bus duct is the method, shown and described in application Serial No. 20,114 and characterized by the fact that bus bar is inserted into partially formed semi-closed duct which is then closed in completely around the bus bar. The method of this application, as contradistinguished from the method of the above mentioned application, is characterized by the fact that continuous ribbons of bus bar are placed on partially formed but not even partially closed in duct which, after having the bus bars associated therewith, is formed into a closed in slotted tubular duct.

For an understanding of the method and machine herein disclosed, reference should be had to the accompanying drawings. In these drawings, Fig. 1 is a fragmentary view of the end of a completed section of bus duct;

Figs. 2 and 2a are diagrammatic elevation and plan views respectively of a machine for forming bus duct;

Figs. 3-7 are fragmentary plan views of the rollers of the machine and of the strips of material as they pass through these rollers; and Figs. 8-24 inclusive are transverse sectional views of the strips of material as they pass through the rollers and illustrate the shapes and relations of these strips as they pass through the machine.

The bus duct

Figure 4:
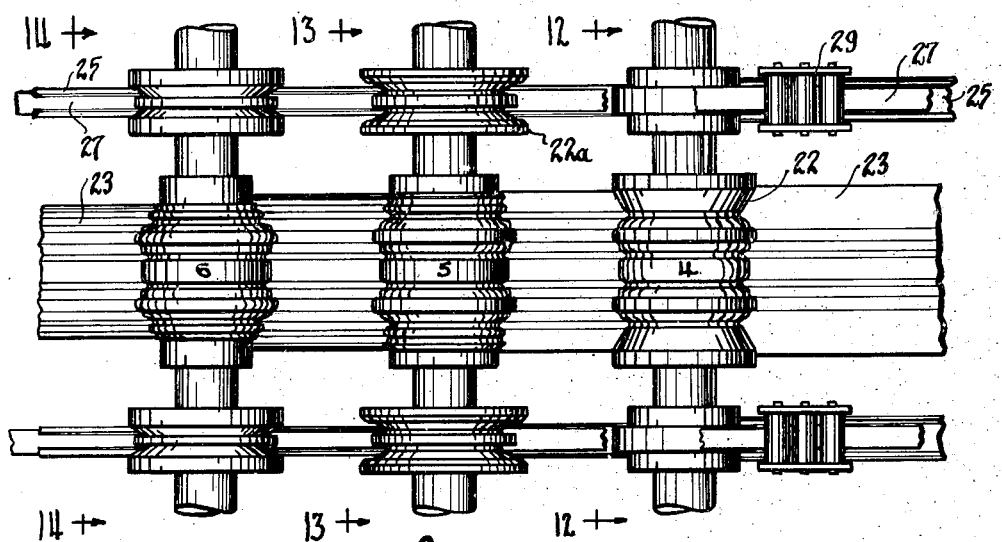

Bus duct produced by the method and machine herein shown includes duct 10 having parallel walls 11, one of which is provided with a slot 12. Disposed edgewise between and in beads of these walls are folded strips 14 of insulation and disposed within these strips of insulation are bus bars 15.

The parts 10, 14, and 15 may be made of suitable materials; for example, duct 10 may be of steel, insulation 14 of fiber, and bus bars 15 of copper; other materials may, however, be employed.

This form of bus duct is substantially the same as that shown in application Serial No. 20,114. It may be formed by the method disclosed in that application or by the method which is disclosed herein and which will now be described.

The method in general

Generally speaking, the method of this application comprises feeding, from spools, a ribbon of duct material (steel), two ribbons of insulation (fiber), and two ribbons of bus bar material (copper), causing these ribbons to course individually and simultaneously and at the same rate through beading rolls which bead the steel ribbon and which associate the fiber and the copper ribbons to form two separate and independent compound ribbons, each of which includes a ribbon of fiber folded and enshrouded about a ribbon of copper; then disposing the compound ribbons of fiber and copper into the steel ribbon and transversely closing in the latter thereafter around the compound ribbons.

The machine in general

In Figs. 2 and 2a there is shown a lay-out or diagrammatic representation of a machine in general for carrying out the methods heretofore described. Generally speaking, the machine includes a bed or frame 20 upon which are mounted, on suitably disposed transverse axles 21 defining a plurality of stations, pairs of rollers 22, 22a, and 22b; the rollers 22 bead the steel ribbon before the fiber and copper ribbons are associated with the steel ribbon; the rollers 22a fold the fiber ribbons around the copper ribbons before these compound ribbons are associated with the beaded steel ribbon; the rollers 22b close in the steel ribbon around the fiber and copper ribbons.

The rollers are arranged in a plurality of stations (fifteen). Stations 1—2 include steel beading rollers 22; stations 3—7 include steel beading rollers 22 and, on the same axles, fiber folding rollers 22a; stations 8—15 include only rollers 22b for closing in the beaded steel ribbon around the compound ribbons of fiber and copper.

Operation

A wide ribbon of steel 23 is fed from a reel 24 through the pairs of rollers 22—22b and as this ribbon passes through these rollers, in stations 1—7, it is longitudinally beaded, passing through the configurations shown in Figs. 8–15 respectively. Continuous ribbons of fiber 25 are fed from reels 26 which are outside of but coaxial with reel 24 to run along and considerably below continuous ribbons of copper 27 fed from reels 28, and these fiber ribbons pass through rollers 22a; in stations 3—7 (Figs. 11–15) rollers 22a flange and fold the edges of the fiber ribbons around the edges of the copper ribbons, which, in stations 1—4 are well above the fiber ribbons, passing through guides 29, and which, between stations 4—5, are deflected downwardly to lie along and against the partially flanged fiber ribbons, (Figs. 8–15) and within their flanges.

Figure 12:
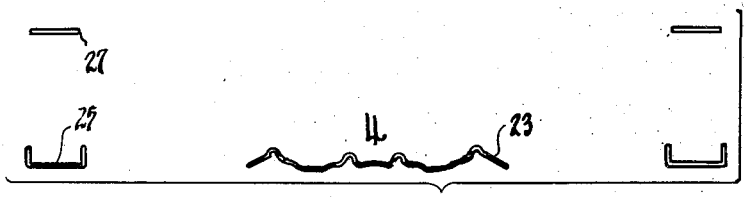
Figure 13:
Figure 14:
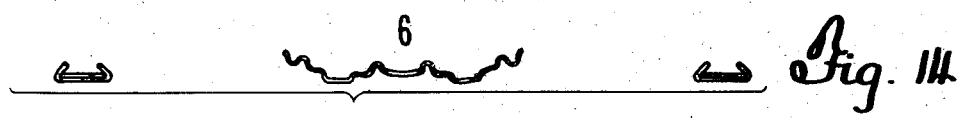
Figure 7:
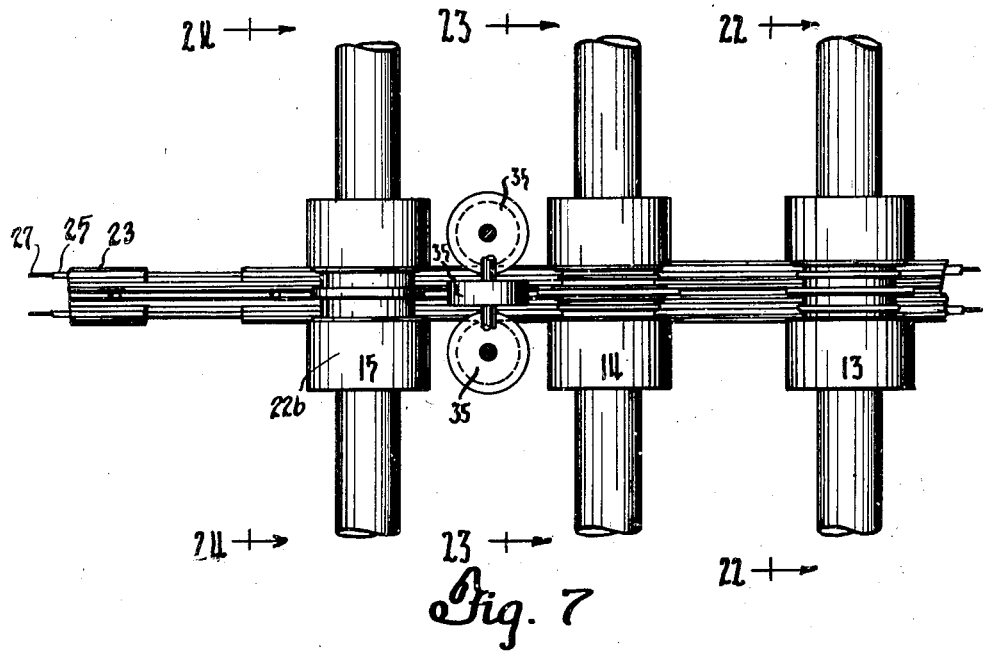
Figure 22:
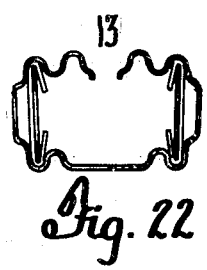
Figure 24:
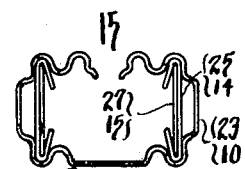
Figure 23:
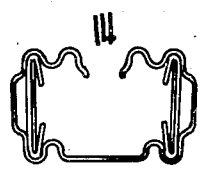

Until the copper ribbons enter station 5, their shapes and their positions relative to the steel ribbon and to the fiber ribbons are unchanged from what was the case at the beginning of feeding. As the fiber ribbons pass through stations 1 and 2, their shapes remain unchanged from the original shapes; as they pass through stations 3—4, they are flanged at their edges, as shown in Figs. 11–12, and as they pass through stations 5—7, as disclosed in Figs. 13–15, their flanged edges are folded inwardly until they are completely retroverted on the copper ribbons enclosed within the thus-folded fiber ribbons.

By the time the steel, fiber, and copper ribbons have passed through station 7 they have received the shape and relation shown in Fig. 15. Between stations 7 and 8 the compounded fiber and copper ribbons are turned and moved into juxtaposition with the beaded steel ribbon until the parts are in the relation of Fig. 16. As the juxtaposed steel, fiber, and copper ribbons pass through station 8, the closing in of the steel ribbon around the compound ribbons commences and in stations 8—15 inclusive such closing in continues, and the parts assume the shapes and relations disclosed in Figs. 17–24 inclusive, the latter figure representing, in cross section, a completely formed duct.

Details of the machine

In order to accomplish the desired results expeditiously and efficiently, important details of construction have been combined with the rollers heretofore described.

The various rollers 22—22b are so designed that the beading and closing in of the steel is done in stages with the center of the ribbon being beaded before the edges are beaded and closed in. As shown in Figs. 8–15 inclusive the first bead produced in the steel ribbon is a center bead; the beads on either side of the center bead are then formed and continuously so on, until the ribbon has received all the desired beads; thereafter it is closed in.

It will also be observed that the steel ribbon is provided with all of the beads desired before it is closed in around the compounded ribbons of fiber and insulation. The beading of the steel ribbon is accomplished completely in stations 1—7 and stations 8—15 do nothing more than to close in the beaded ribbon of steel around the compound ribbons of fiber and copper.

Between stations 7 and 8 it is necessary to direct the compound ribbons of fiber and copper up over the edges of and towards the center of the steel ribbon and towards each other and also to turn these compound ribbons so that they will not be coplanar with the steel ribbon as they were in station 7 but will be transverse of the steel ribbon as they are in station 8, and in order to accomplish this result deflecting rollers 34 and a deflecting shoe 35 are provided just in advance of station 8, and these rollers and this shoe operate to accomplish the results just described.

In order to insure the bus duct, as it leaves station 15, being in exactly the desired form, guiding rollers 36 are positioned between stations 14 and 15 to cooperate with the bus duct as it leaves station 14 and to guide the same accurately into the rollers of station 15.

I claim:

1. A method of making slotted tubular beaded duct containing inserts of considerably less cross sectional area than the interior of the duct, comprising longitudinally beading flat duct ribbon, laying two insert ribbons against the beaded duct ribbon with an edge of each insert ribbon against the duct ribbon and in a bead thereof, thereafter closing in the duct ribbon around the insert ribbons and into engagement with the hitherto free edges of the ribbons, with the aforesaid free edges being received in beads of the duct ribbon, to form a slotted tubular duct and so that all four edges of the insert ribbons are against facing walls of the duct and in beads thereof.

2. A method for making slotted tubular beaded duct containing insert of considerably less cross sectional area than the interior of the duct with the insert having flat broad sides and narrow edges whose widths are only small fractions of the widths of the sides, comprising longitudinally beading flat duct ribbon having flat broad sides and narrow edges whose widths are only small fractions of the widths of the sides, thereafter laying insert ribbon against the beaded duct ribbon with an edge of the insert ribbon against a flat side of the duct ribbon and in a bead thereof, and then bending the duct ribbon about the insert ribbon to form a duct as described, the duct ribbon at one side of the insert ribbon being bent to form a side wall in spaced relation to the insert ribbon and a top wall extending above the insert ribbon, and to bring a bead located in the aforesaid top wall over the free end of the insert ribbon to lock the same in place, and the duct ribbon at the other side of the insert ribbon being bent to form a section all portions of which are spaced from the insert ribbon.

3. A method for making slotted tubular duct containing insert of considerably less cross sectional area than the interior of the duct comprising laying insert ribbon against the duct ribbon with an edge of the insert ribbon against the duct ribbon and with the flat side of the insert ribbon transverse to the flat side of the duct ribbon, and then binding the duct ribbon about the insert ribbon to form a duct as described, the duct ribbon at one side of the insert ribbon being bent to form a side wall in spaced relation to the insert ribbon and a top wall engaging the free edge of the insert ribbon, and the duct ribbon at the other side of the insert ribbon being bent to form a section all portions of which are spaced from the insert ribbon.

4. A method for making slotted tubular duct containing insert of considerably less cross sectional area than the interior of the duct comprising laying insert ribbon against the duct ribbon with an edge of the insert ribbon against the duct ribbon and with the flat side of the insert ribbon transverse to the flat side of the duct ribbon, and then bending the duct ribbon about the insert ribbon to form a duct as described, the duct ribbon at one side of the insert ribbon being bent to form a side wall and a top wall which engages the free edge of the insert ribbon, and the duct ribbon at the other side of the insert ribbon being bent to form a section all portions of which are spaced from the insert ribbon.

5. A method of making slotted tubular beaded bus duct containing insulated bus bars of considerably less cross sectional area than the interior of the duct, comprising longitudinally beading flat duct ribbon, simultaneously applying an insulating covering to bus ribbons, laying two insulated bus ribbons against the beaded duct ribbon with an insulated edge of each insulated bus ribbon against the duct ribbon and in a bead thereof, thereafter closing in the duct ribbon around the insulated bus ribbons and into engagement with the hitherto free edges of the bus ribbons, with the aforesaid free edges being received in beads of the duct ribbon, to form a slotted tubular bus duct and so that all four insulated edges of the bus ribbons are against facing walls of the duct and in beads thereof.

WILLIAM H. FRANK.